(12) United States Patent
Chang et al.

(10) Patent No.: US 6,780,213 B2
(45) Date of Patent: Aug. 24, 2004

(54) PERSONAL AIR CLEANING APPARATUS

(76) Inventors: Jo Won Chang, #138-307 Hanbit Apt. Eoeun-dong, Yusung-ku, Daejun-si, 305-333 (KR); Oh Hyun Roh, #409-1201 Hyundai APT. Seohyun-dong, Bundang-ku, Seongnam-si 463-050 (KR)

( * ) Notice: Subject to any disclaimer, the term of this patent is extended or adjusted under 35 U.S.C. 154(b) by 0 days.

(21) Appl. No.: 10/073,928

(22) Filed: Feb. 14, 2002

(65) Prior Publication Data

US 2003/0150195 A1 Aug. 14, 2003

(51) Int. Cl.[7] ............................................. B01D 46/12
(52) U.S. Cl. ...................... 55/385.2; 55/385.1; 55/356; 55/DIG. 18; 55/DIG. 46; 454/187
(58) Field of Search .......................... 55/385.1, 385.2, 55/356, DIG. 18, DIG. 46; 454/187

(56) References Cited

U.S. PATENT DOCUMENTS

| | | | | |
|---|---|---|---|---|
| 4,023,472 A | * | 5/1977 | Grunder et al. | ............ 55/385.2 |
| 4,045,192 A | * | 8/1977 | Eckstein et al. | ............ 55/385.2 |
| 4,756,728 A | * | 7/1988 | Conrad | ............ 55/385.2 |
| 5,702,493 A | * | 12/1997 | Everetts et al. | ............ 55/536 |
| 6,323,308 B1 | * | 11/2001 | Kobayashi et al. | |
| 6,395,047 B1 | * | 5/2002 | Smith | ............ 454/187 |
| 6,444,002 B1 | * | 9/2002 | Mai | ............ 55/385.1 |

\* cited by examiner

*Primary Examiner*—Minh-Chau T. Pham
(74) *Attorney, Agent, or Firm*—Birch, Stewart, Kolasch & Birch LLP

(57) ABSTRACT

A personal air cleaning apparatus which draws in, in a concentrated fashion, air present in a contaminated zone, and outwardly discharges the air to a clean zone after the air has been filtered. The apparatus includes a sucking/discharging unit having a suction port for sucking in contaminated air, and a discharge port for discharging filtered air, a filter for outwardly discharging air received from the sucking/discharging unit while supplying clean air via the sucking/discharging unit, a conduit for connecting the sucking/discharging unit to the filter, and a position determining member arranged around the conduit unit and adapted to allow the conduit unit to be bent without being folded, while fixing the position of the sucking/discharging unit.

24 Claims, 6 Drawing Sheets

PERSONAL AIR CLEANING APPARATUS

BACKGROUND OF THE INVENTION

1. Field of the Invention

The present invention relates to an air cleaning apparatus for sucking contaminated indoor air, and discharging the sucked air after filtering the air, and more particularly to a personal air cleaning apparatus configured to freely adjust air sucking and discharging positions, thereby being capable of drawing in, in a concentrated fashion, air present in a contaminated zone, and outwardly discharging filtered air and supplying it to a zone to establish a local clean zone.

2. Description of the Related Art

Generally, air cleaners perform functions of sucking in contaminated air from a room, outwardly discharging the sucked-in air, and supplying clean air into the room.

Various air cleaners are known. For example, there are anion generators for cars, and stand type large-scale conditioners incorporated in air conditioners. In addition, an integrated illuminating appliance is known, which can perform the functions of a humidifier, an air cleaner, and a desk lamp.

A multi-function illuminating appliance is also known, which is configured to be installed in the ceiling of a room. This illuminating appliance not only has an illuminating function, but also has an air cleaning function for cleaning indoor air.

In such conventional air cleaners, however, it is difficult to adjust the installation level and position because the air cleaners have a box type body. For this reason, it is impossible to effectively use such conventional air cleaners for individuals. In other words, the conventional air cleaners have a low cleaning efficiency because they are adapted to clean air in the entire portion of a room.

SUMMARY OF THE INVENTION

Therefore, the present invention has been developed in view of the above mentioned problems involved with the related art, and accordingly an object of the present invention is to provide a personal air cleaning apparatus which sucks, in a concentrated fashion, air present in a contaminated zone, and outwardly discharges the sucked air or supplies filtered air to the zone, thereby securing a local clean zone.

In accordance with one aspect, the present invention provides A personal air cleaning apparatus comprising: a sucking/discharging unit having a suction port for sucking in contaminated air, and a discharge port for discharging filtered air, a filter for outwardly discharging air received from the sucking/discharging unit while supplying clean air via the sucking/discharging unit; a conduit for connecting the sucking/discharging unit to the filter, and a position determining member arranged around the conduit unit and adapted to allow the conduit unit to be bent without being folded, while fixing the position of the sucking/discharging unit.

In accordance with another aspect, the present invention provides a personal air cleaning apparatus comprising: a sucking/discharging unit having a suction port for sucking in contaminated air, a discharge port for discharging filtered air, and a filter for filtering contaminants contained in the air; a filter for outwardly discharging contaminated air received from the sucking/discharging unit; a conduit for connecting the sucking/discharging unit to the filter; and a position determining member arranged around the conduit unit and adapted to allow the conduit unit to be bent without being folded, while fixing the position of the sucking/discharging unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
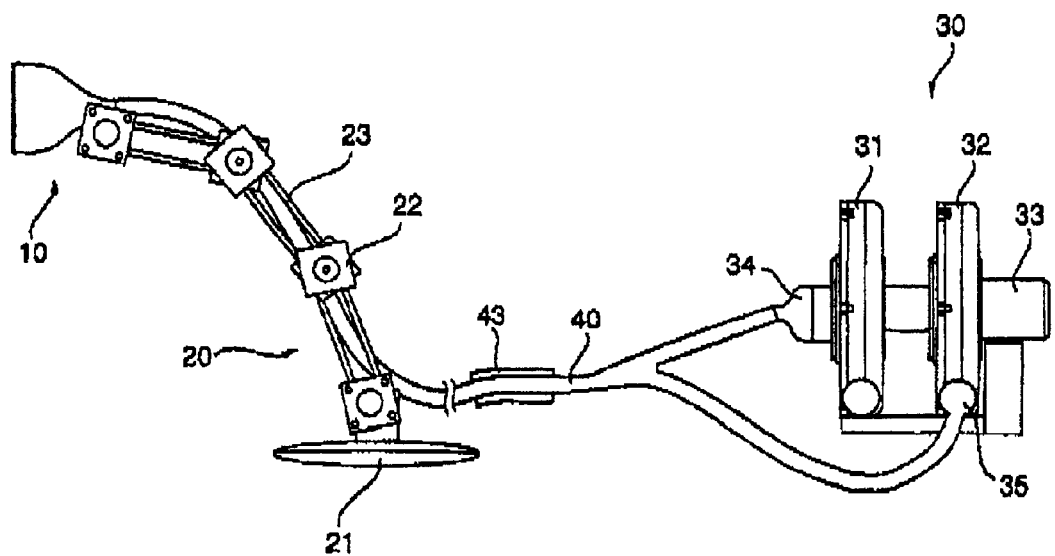
FIG. 1 is a view schematically illustrating the personal air cleaning apparatus according to one embodiment of the present invention.

Now, preferred embodiments of the present invention will be described with reference to the annexed drawings.

Referring to FIGS. 1 to 9, a personal air cleaning apparatus according to an embodiment of the present invention is illustrated. As shown in FIGS. 1 to 9, the personal air cleaning apparatus includes a sucking/discharging unit 10 having a suction port for sucking in contaminated air, and a discharge port for discharging filtered air, a filter 30 for outwardly discharging air received from the sucking/discharging unit 10 while supplying clean air via the sucking/discharging unit 10, a conduit 40 for connecting the sucking/discharging unit 10 to the filter 30, and a position determining member 20 arranged around the conduit unit 40 and adapted to allow the conduit unit 40 to be bent without being folded, while fixing the position of the sucking/discharging unit 10.

Figure 2:
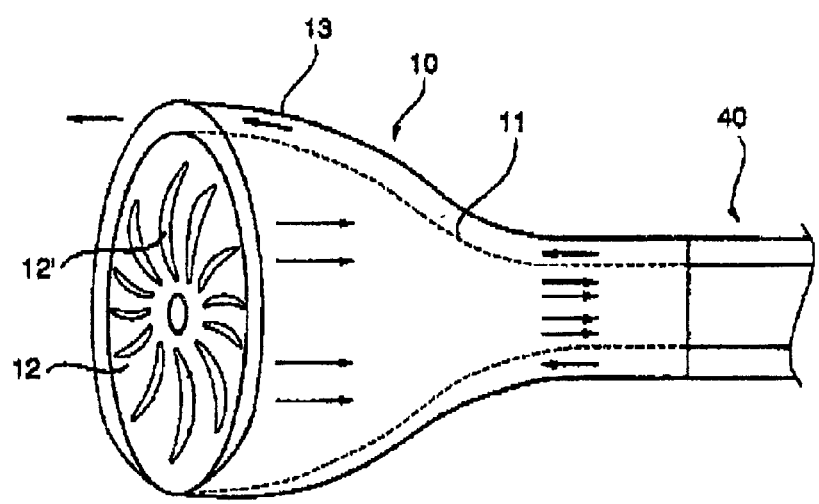
FIG. 2 is a view illustrating a sucking/discharging unit included in the personal air cleaning apparatus of FIG. 1.

As shown in FIG. 2, the sucking/discharging unit 10 includes a suction guide 11 provided with a suction port at one end thereof while being connected to the conduit 40 at the other end thereof, a suction port cap 12 mounted to the suction port of the suction guide 11 and containing a plurality of suction holes 12' to guide a flow of air introduced therein, and a discharge guide 13 formed with a discharge port at one end thereof, connected to the conduit 40 at the other end thereof, and arranged around the suction guide 11 while being spaced apart from the suction guide 11 by a desired gap to guide the flow of discharged air having a shape similar to that of the suction guide 11.

The discharge guide 13 is configured to partially block the discharge port so that it forms a contaminated air passage connecting the discharge port to the suction port. That is, the discharge port is blocked at a region extending through an angle of 30° to 200°. At this region, there is no discharge port. Alternatively, the discharge port may be blocked by a cover at the blocking region.

Figure 3:
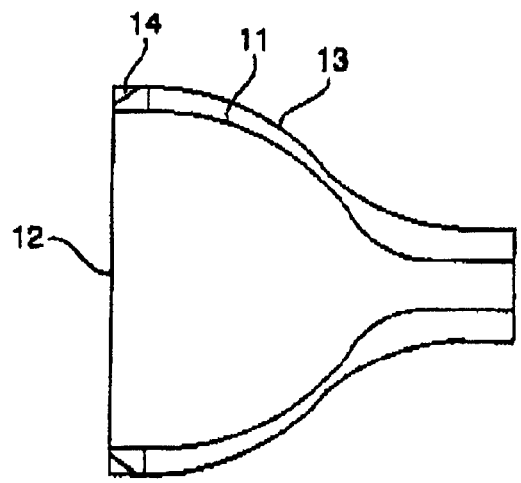
FIG. 3 is a sectional view illustrating the sucking/discharging unit included in the personal air cleaning apparatus of FIG. 1.
Figure 4:
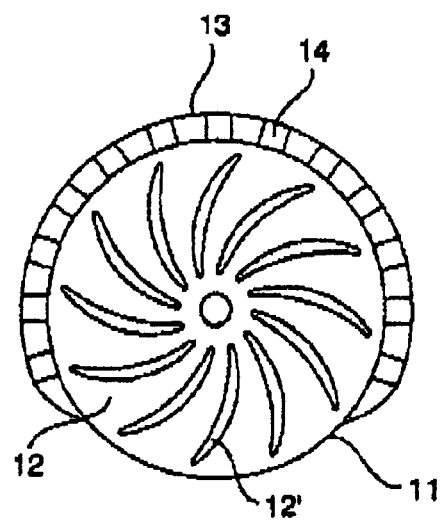
FIG. 4 is a view illustrating the suck/discharging unit when viewed toward its suction port.

A discharge air passage is defined between the discharge guide and the suction guide 11, as shown in FIGS. 3 and 4. Guide vanes 14 are mounted to the downstream end of the discharge air passage to guide a flow of air discharged through the discharge air passage. The suction port cap 12 is provided with a plurality of uniformly distributed suction holes 12'. The shape and arrangement of suction holes 12' may be optional.

Of course, the sucking/discharging unit 10 is configured so that the portion thereof connected to the conduit 40 has a neck having a smaller diameter than the portion which defines the suction port and discharge port. It is preferable for the neck to have a minimum diameter, taking into consideration the flow rate of air, in order to prevent various problems caused by an unnecessarily increased diameter of the conduit 40, to prevent any inconvenience in the disposition of the unit caused by the conduit when the conduit is installed on the floor, and to allow the apparatus to be installed beneath a desk or partition.

Figure 5:
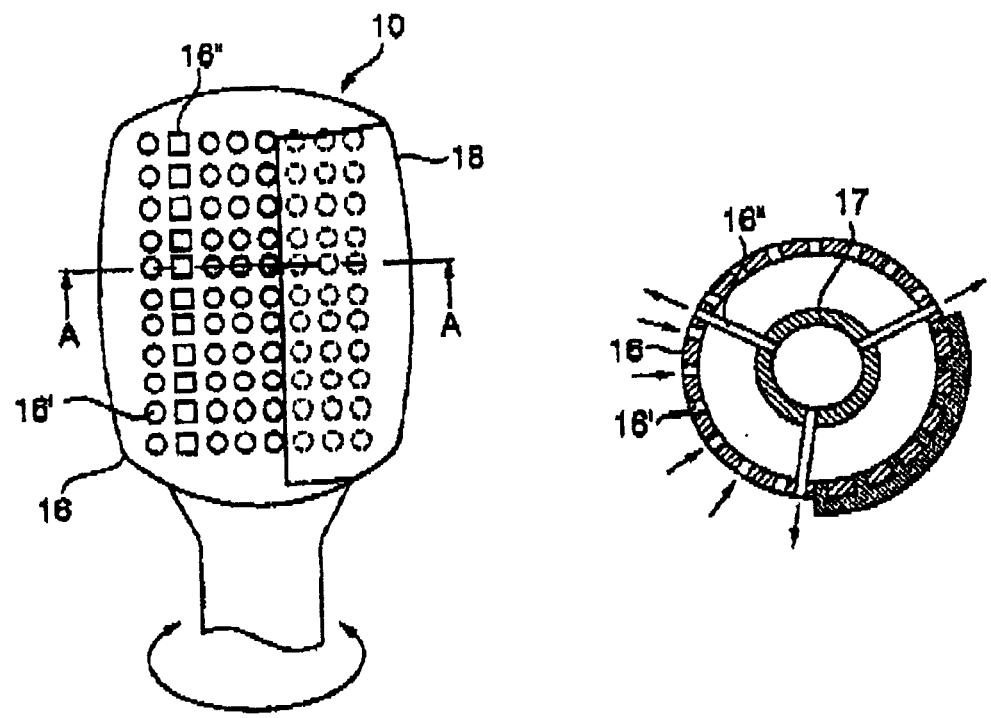
FIG. 5 is a view illustrating a sucking/discharging unit according to another embodiment of the present invention.

As shown in FIG. 5, the neck of the sucking/discharging unit connected to the conduit 40 is rotatable. An outer case 16 is mounted to the sucking/discharging unit 10. The outer case 16 is formed with suction holes 16' and discharge holes 16" along the entire side portion thereof. Alternatively, the suction holes 16' may be formed to communicate with the outer case, whereas the discharge holes 16" may be formed to communication an inner case 17. In this case, air sucked at the suction holes 16' is surrounded by the discharge holes 16" arranged in a desired region, in order to achieve an increase in sucking efficiency or to block contaminated air. Alternatively, a blocking cover 18 may be installed which blocks the suction holes 16' within a desired region. The blocking cover 18 should be configured to be detachable, in order to allow the sucking operation or sucking/discharging operations to occur at a desired region, thereby achieving an increase in the sucking force.

Figure 6:
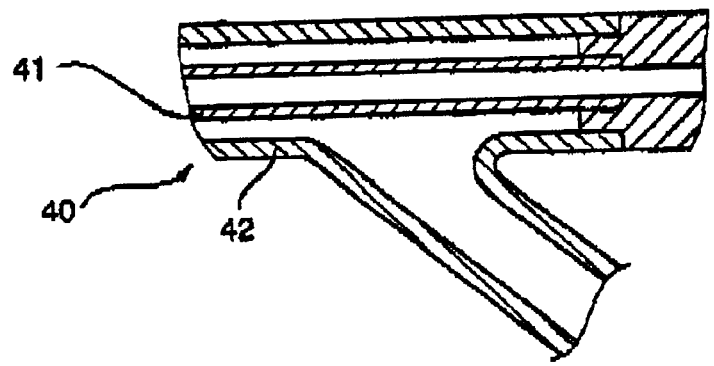
FIG. 6 is a sectional view illustrating a conduit included in the personal air cleaning apparatus of FIG. 1.

As shown in FIGS. 1 and 6, the conduit 40 includes an inner conduit 41 connected at one end thereof to the suction guide 11 while being connected at the other end thereof to a sucking section 34 included in the filter 30, and an outer conduit 42 arranged around the inner conduit 41 while defining a passage for clean air in cooperation with the inner conduit 41. The outer conduit 42 is connected at one end thereof to the discharge guide 13 while being connected at the other end thereof to a discharge section 35 included in the filter 30. The conduit 40 has a detachable end structure so that its length is adjustable. The conduit 40 has no portion sharply bent through an angle of not more than 90°, so that it does not interfere with the flow of air.

The conduit 40 further includes an attenuation member 43 for attenuating vibrations or noise caused by air flowing through the conduit 40.

In place of the conduit 40, which has a double conduit structure, separate conduits may be used for suction and discharge purposes, respectively. That is, a conduit unit including two conduits can be used without any problem in accordance with the present invention. Also, there is no limitation on the type and structure of the conduit, in so far as the conduit serves to connect the sucking/discharging unit to the filter.

The filter 30 includes a suction section 31 connected to the suction guide 11 of the sucking/discharging unit 10, and adapted to generate a sucking force, a blower 32 connected to the discharge guide 13 of the sucking/discharging unit 10, and adapted to feed clean air under pressure, and a motor 33 for simultaneously driving the suction section 31 and blower 32. As described above, the suction section 34 and discharge section 35 are also included in the filter 30. The suction section 34 connects the suction section 31 to the inner conduit 41 of the conduit 40, whereas the discharge section 35 connects the blower 32 to the outer conduit 42.

The suction section 31 and blower 32 communicate with the atmosphere, and serve to outwardly discharge contaminated air into the atmosphere while drawing in fresh air and feeding it to the system under pressure. Alternatively, the suction section 31 may communicate with the blower 32. In this case, an air filtering chamber (not shown) is arranged between the suction section 31 and the blower 32. Contaminated air introduced into the filter 30 through the suction section 31 is filtered in the air filtering chamber, and then feed under pressure by the blower 32. Of course, the sucking/discharging unit shown in FIG. 5 is modified in such a fashion that the inner conduit 41 is used for discharged air, whereas the outer conduit 42 is used for drawing-in air. However, the remaining configuration and the entire operation are the same as those of the above described case. Accordingly, no further description will be given.

Figure 7:
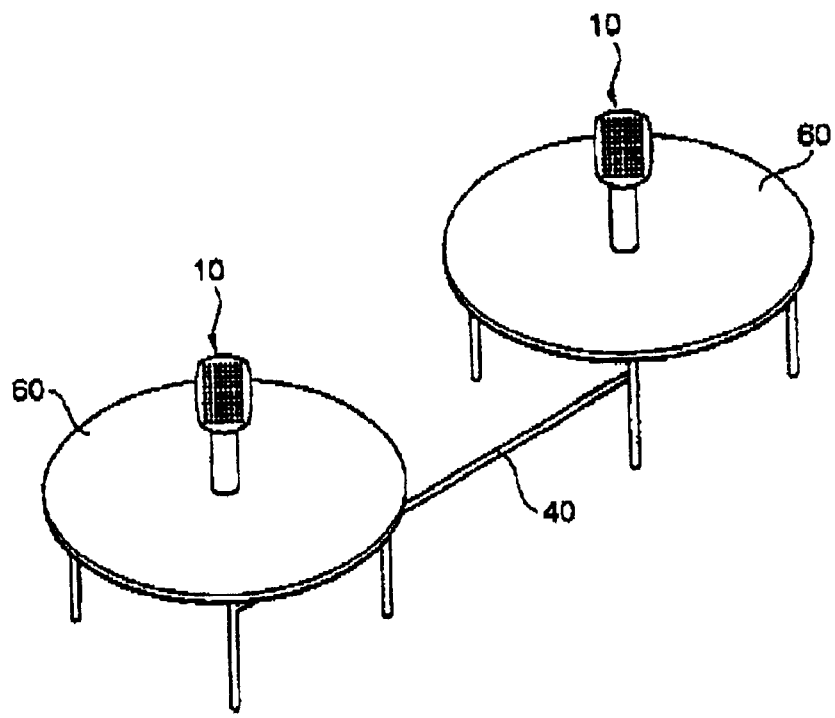
FIG. 7 is a view illustrating an example in which the sucking/discharging units of FIG. 5 are installed in a conference room.

Each of the suction and discharge sections 34 and 35 may have a branched tube structure in order to allow a plurality of sucking/discharging units 10 to be simultaneously connected thereto. In this case, it is possible to simultaneously perform air cleaning operations at several areas under the condition in which a plurality of sucking/discharging units 10 are connected to a single filter. Where such a system is installed at a conference room, its sucking/discharging units 10 can be installed at respective tables 60, as shown in FIG. 7. Accordingly, a high utility is obtained.

The position determining member 20 includes a base 21 fixed to the floor, a plurality of hinge members 22 arranged between the base 21 and the neck of the sucking/discharging unit 10 while being uniformly spaced apart from one another, and adapted to protect the conduit 40, and link members 23 adapted to connect the hinge members 22, and a spring member (not shown) for bearing the weight of the hinge members 22. The position of the sucking/discharging unit 10 is determined by the position determining member 20 including the hinge members 22 and link members 23. A flexible hose may be used in place of the position determining member 20. In this case, the flexible hose can be adjusted in direction and height by itself, and then fixed without using any hinge member and link member. In addition, the conduit, which connects the sucking/discharging unit to the filter, should not be folded or sharply bent, in order to prevent generation of a flow resistance.

Figure 8:
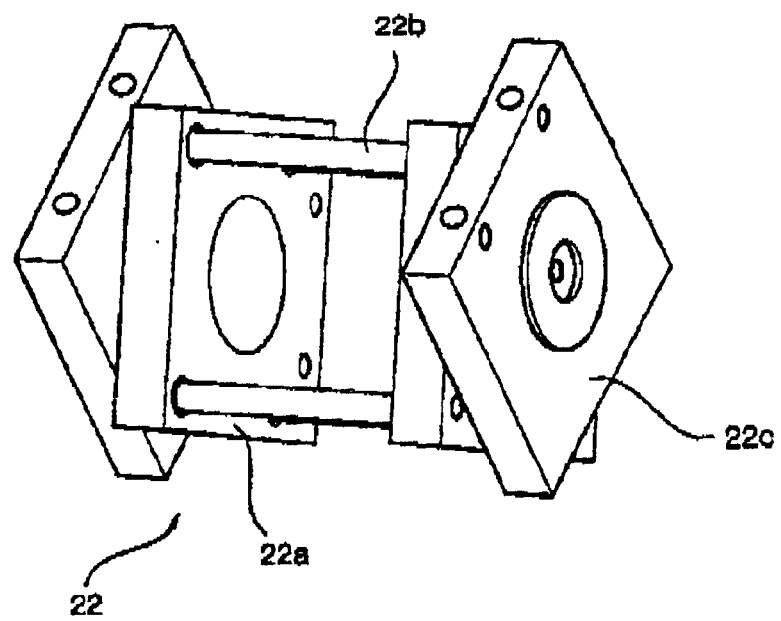
FIG. 8 is a view illustrating a hinge member.

As shown in FIG. 8, each hinge member 22 includes a pair of inner plates 22a spaced apart from each other by a desired gap to receive the conduit 40 therebetween, connecting rods 22b adapted to connect the inner plates 22a while maintaining the gap between the inner plates 22a, and a pair of outer plates 22c rotatably mounted to the inner plates 22a outside the inner plates 22a, respectively. The outer plates 22c are coupled with associated ones of the link members 23, respectively.

Figure 9:
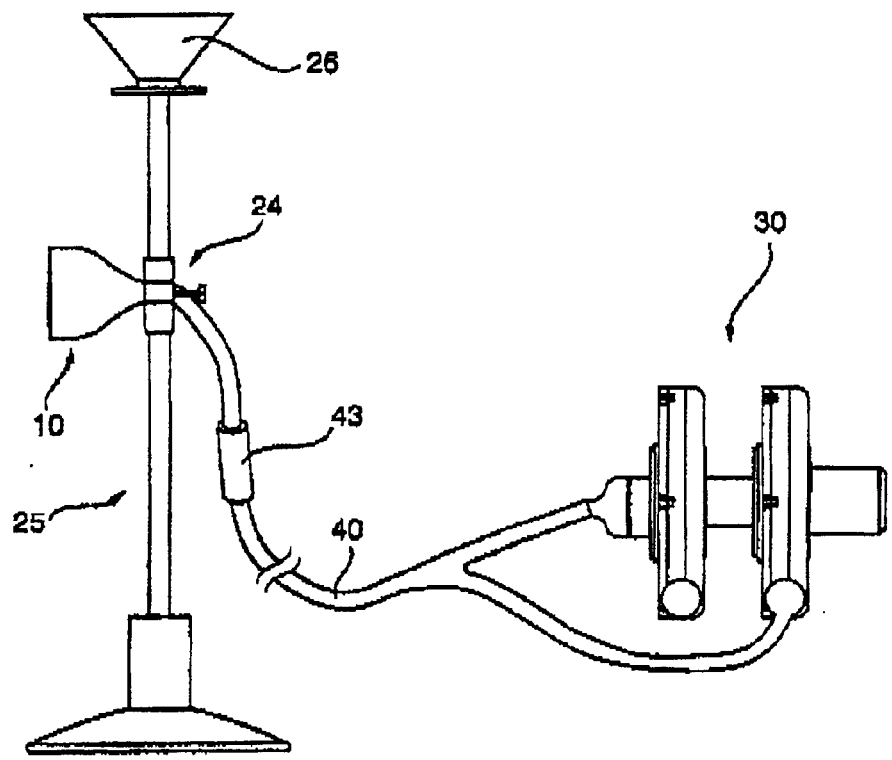
FIG. 9 is a view illustrating another type of installation of the sucking/discharging units.

The conduit 40 may comprise a flexible hose, as shown in FIG. 9. The position determining member 20 may comprise locking means 24 mounted to a desired portion of the sucking/discharging unit 10, and adapted to lock the sucking/discharging unit 10 in a position adjusted state in vertical and horizontal directions, and support means 25 coupled to the sucking/discharging unit 10 by the locking means 24 to support the sucking/discharging unit 10. The support means 25 may also be used as a stand type coat hanger or lamp 26.

The sucking/discharging unit 10 has a humidification function, in order to improve the effect of filtered air in accordance with an addition of the humidification function to the air discharge function of the sucking/discharging unit 10.

Since the position of the sucking/discharging unit of the personal air cleaning apparatus having the above described configuration in accordance with the present invention can be optionally set, it is possible to rapidly and surely perform a desired air cleaning operation for a severely contaminated area.

The filter 30 is installed outdoor, whereas the sucking/discharging unit 10 is installed in the vicinity of a contamination source such as a smoker or a contamination area in a kitchen. Accordingly, contaminant such as cigarette smoke is introduced into the filter 30 via the suction port of the sucking/discharging unit 10, and the conduit 40. Also, clean air from the filter 30 is supplied, via the discharge port and conduit, to the area where the contamination source is present. Accordingly, air cleaning is rapidly performed at the area where the contamination source is present.

The position of the sucking/discharging unit 10 is determined by the position determining member 20 including the hinge members and link members. A flexible hose may be used in place of the position determining member 20. In this case, the flexible hose can be adjusted in both direction and height by itself, and then fixed without using any hinge member and link member. In addition, the conduit, which connects the sucking/discharging unit to the filter, should not be folded or sharply bent, in order to prevent generation of a flow resistance.

Since each of the suction and discharge sections 34 and 35 has a branched tube structure, it is possible to connect a plurality of sucking/discharging units to the single filter. Accordingly, where the sucking/discharging units are installed at respective tables in a conference room, it is possible to rapidly filter contaminants generated around those tables. Also, the suction holes may be formed in such a fashion that they are oriented in a particular direction facing smokers. Alternatively, the suction holes may be formed in such a fashion that they are oriented in all directions. In the latter case, a blocking cover is provided to block the suction holes in a particular region. In this case, the suction holes not blocked are oriented to face the smokers. Accordingly, non-smokers can attend a meeting with smokers without suffering from smoke. Also, such a system is very useful for the health of smokers.

The discharge section, which is formed around the suction port, that is, at the outer ends of the suction and discharge guides 11 and 13, while being inclined at a desired angle, serves to allow air to be discharged while forming a vortex flow. Thus, the discharge section increases sucking and discharging efficiencies. Also, the attenuation member 43 is installed at the conduit 40, thereby attenuating vibrations or noise caused by air flowing through the conduit 40.

Figure 10:
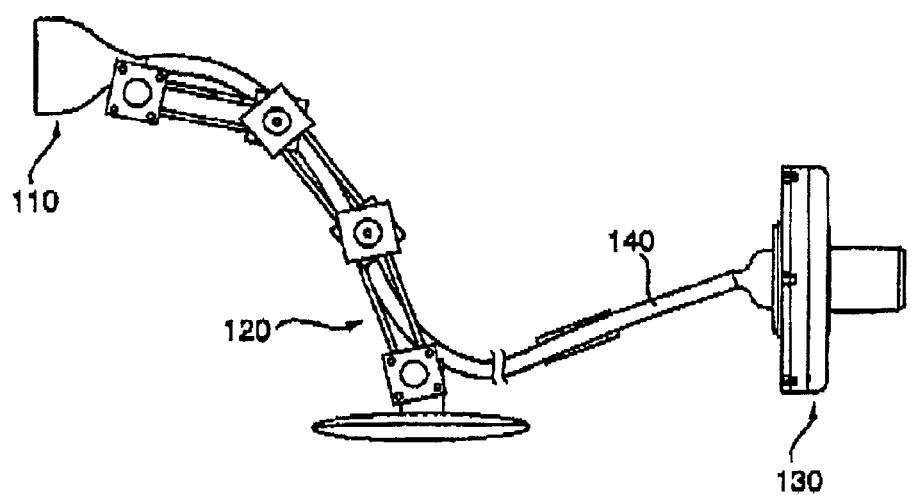
FIG. 10 is a view schematically illustrating a personal air cleaning apparatus according to yet another embodiment of the present invention.

Referring to FIG. 10, a personal air cleaning apparatus according to another embodiment of the present invention is illustrated. As shown in FIG. 10, the personal air cleaning apparatus includes a sucking/discharging unit 110 having a suction port for sucking contaminated air, a discharge port for discharging filtered air, and a filter for filtering contaminants contained in air, the filter 130 being provided for outwardly discharging contaminated air received from the sucking/discharging unit 110, a conduit 140 for connecting the sucking/discharging unit 110 to the filter 130, and a position determining member 120 arranged around the conduit unit 140 and adapted to allow the conduit unit 140 to be bent without being folded, while fixing the position of the sucking/discharging unit 110. The position determining member 120 may be replaced by a flexible hose which is adjustable in direction and height by itself, and then fixed without using any hinge member and link member.

Figure 11:
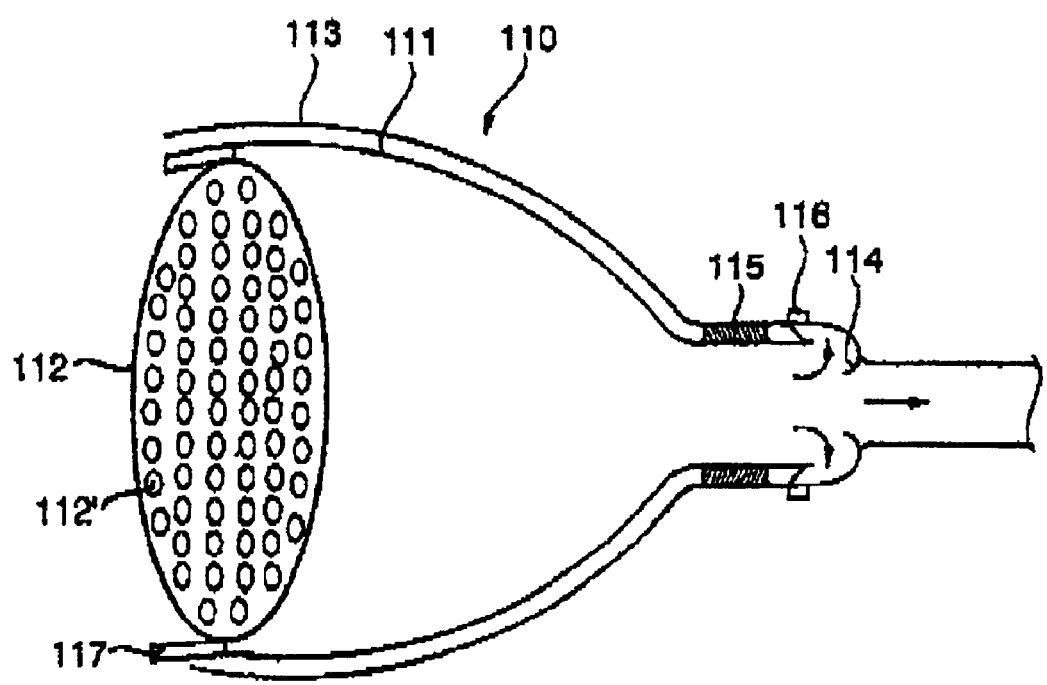
FIG. 11 is a view illustrating the sucking/discharging unit included in the personal air cleaning apparatus of FIG. 10.

As shown in FIG. 11, the sucking/discharging unit 110 includes a suction guide 111 provided with a suction port at one end thereof while being connected to the conduit 140 at the other end thereof, a suction port cap 112 mounted to the suction port of the suction guide 111 while having a plurality of suction holes 112' to guide a flow of air introduced therein, a discharge guide 113 formed with a discharge port at one end thereof, connected to the conduit 140 at the other end thereof, and arranged around the suction guide 111 while being spaced apart from the suction guide 111 by a desired gap to guide a flow of discharged air while having a shape similar to that of the suction guide 111, a U-turn guide 114 mounted at the other end of the discharge guide 113 and adapted to partially return, to the discharge port, the contaminated air introduced by the suction guide 111, and a filter 115 arranged between the suction guide 111 and the discharge guide 113 and adapted to filter the contaminated air returned by the U-turn guide 114.

Flow rate control means 116 is installed between the discharge guide 113 and the suction guide 111 in order to control the amount of air supplied to the filter 115. The U-turn guide 114 is adjustable in installation angle in order to adjust the amount of air returned to the discharge port. Guide vanes 117 are mounted to the downstream end of the discharge guide 113 in order to change the flow direction of discharged air.

The operation and function of the personal air cleaning apparatus illustrated in FIG. 10 are similar to those of FIG. 1. Accordingly, no further description will be given.

In this embodiment, however, the filter 130 and conduit 140 perform only the sucking function. That is, they serve to supply only the air filtered by the filter, without supplying fresh external air. Since the supplied air is small in quantity, this apparatus may have the disadvantage that the time taken to clean the entire air is lengthy.

It is necessary to design the conduit and wirings used for the motor in the above described embodiments of the present invention, taking into consideration the appearance.

Preferably, the sucking/discharging unit 10 or 110 is configured so that its neck connected to the conduit 40 or 140 has a minimum diameter while having a smooth cross-sectional shape having no step, in order to prevent generation of pressure loss. The sucking/discharging unit 10 or 110 has a maximum cross-sectional area at its suction port region. The sucking/discharging unit 10 or 110 may have diverse cross-sectional shapes such as triangular, square, rectangular, pentagonal, hexagonal, heptagonal, octagonal, circular, and oval shapes. The suction holes 12', 16' or 112' formed at the suction port, and discharge holes 16" are not limited in terms of their shape, size, and number. These parameters may be appropriately selected in accordance with the amount of air to be treated. Where the sucking/discharging unit has a square or rectangular cross-section, the guide vanes 14 or 117 may have an integral structure so that they can simultaneously adjust the discharge angle. On the other hand, where it is difficult to manufacture the guide vanes 14 or 117 to have an integral structure because the sucking/discharging unit has a particular cross-sectional shape, for example, a circular cross-sectional shape, the guide vanes 14 or 117 may be configured to partially adjust the discharge angle.

In the sucking/discharging unit 10 or 110, which is an essential element of the apparatus according to the present invention, a vortex flow is generated from the inclined discharge holes, thereby forming an air curtain surrounding the sucked air. As a result, interference occurs between air sucked through the suction port and air discharged through the discharge port. Accordingly, it is possible to eliminate the danger of suffocation caused by the smoking for a lengthy period of time. It is also possible to compensate for a reduction in the sucking force occurring even when the suction port is slightly spaced apart from the contamination source. Since the air curtain is formed by discharged air, it is possible to prevent contaminated air from escaping from a confined space. In particular, even when the contamination source is a person, for example, a smoker, it is possible to rapidly discharge the contaminant while allowing the smoker to inhale filtered air because both the suction and discharge ports are provided at the sucking/discharging unit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides a personal air cleaning apparatus including a sucking/discharging unit configured to be optionally adjustable in position, thereby effectively removing contaminated air present in a particular zone. Accordingly, the personal air cleaning apparatus has a small and inexpensive structure. The installation, movement, and removal of the apparatus can also be easily achieved.

In accordance with the present invention, the sucking/discharging unit can be positioned in a zone where a contamination source is present, so as to effectively treat the contamination source. The apparatus of the present invention has a minimum conduit cross-sectional area, taking into consideration the flow rate of the air. Accordingly, the apparatus does not serve as an obstacle even when it is installed in a dwelling space.

In accordance with the present invention, a plurality of sucking/discharging units can be connected to a single filter. Accordingly, where such sucking/discharging units are installed at individual seats in an airplane or train, on the floor of an office, desks or tables in the office, the tables in a restaurant, or the floor of the restaurant, they can more effectively remove contaminated air. In particular, where the apparatus of the present invention is installed in a restaurant or the kitchen in the home, contaminated air, for example, smell of food, can be rapidly removed without being diffused into a living room or other rooms.

In particular, where the apparatus of the present invention is installed in a train, ship, or airplane in order to provide smoking seats equipped with air cleaning means for passengers of long-distance travels, there is an advantage in that those passengers can be released from the suffering caused by no smoking for a long period of time. It is also possible to protect non-smokers from secondhand smoking.

In accordance with the present invention, fresh external air or filtered air is discharged around the smoking zone. Accordingly, it is possible to eliminate the danger of suffocation caused by smoking for a lengthy period of time. It is also possible to compensate for a reduction in the sucking force occurring even when the suction port is slightly spaced apart from the contamination source. Since the air curtain is formed by discharged air, it is possible to prevent contaminated air from escaping from a confined space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A personal air cleaning apparatus comprising:
    a sucking/discharging unit having a suction port for drawing in contaminated air, and a discharge port for discharging filtered air;
    a filter for outwardly discharging air received from the sucking/discharging unit while supplying clean air via the sucking/discharging unit;
    a conduit unit for connecting the sucking/discharging unit to the filter; and
    a position determining member arranged around the conduit unit and adapted to allow the conduit unit to be bent without interrupting air flow therethrough, while fixing the position of the sucking/discharging unit, wherein the sucking/discharging unit comprises:
        a suction guide provided with a suction port at one end thereof while being connected to the conduit unit at the other end thereof;
        a suction port cap mounted to the suction port of the suction guide said suction port cap having a plurality of suction holes to guide the flow of air introduced therein; and
        a discharge guide having a shape similar to that of the suction guide and formed with a discharge port at one end thereof, while being connected to the conduit unit at the other end thereof, and arranged around the suction guide while being spaced apart from the suction guide by a desired gap to guide the flow of discharged air from the sucking/discharging unit.

2. The personal air cleaning apparatus according to claim 1, wherein the discharge guide is configured to partially block the discharge port so that it forms a contaminated air passage connecting the discharge port to the suction port.

3. The personal air cleaning apparatus according to claim 2, wherein the discharge port is blocked at a region extending through an angle of 30° to 200° by eliminating the formation of the discharge port at said region, or the discharge port is blocked by a cover at said region.

4. The personal air cleaning apparatus according to claim 2, wherein a discharge air passage is defined by the discharge guide and the suction guide, and guide vanes are mounted at a downstream end of the discharge air passage to guide the flow of air discharged through the discharge air passage.

5. The personal air cleaning apparatus according to claim 1, wherein the position determining member comprises a flexible hose able to be freely bent and to be fixed, and fixing means for fixing the status of the flexible hose, so that the sucking/discharging unit is adjustable in orientation and height by the flexible hose.

6. The personal air cleaning apparatus according to claim 1, wherein the sucking/discharging unit is configured so that the portion thereof connected to the conduit has a diameter smaller than the portion defined by the suction and discharge ports.

7. The personal air cleaning apparatus according to claim 1, wherein:
the sucking/discharging unit has a rotatable neck portion connected to the conduit;
an outer case is mounted to the sucking/discharging unit;
the outer case being formed with suction holes and discharge holes along the entire side portion thereof; and
the discharge holes communicate with an inner case.

8. The personal air cleaning apparatus according to claim 7, wherein the sucking/discharging unit includes a blocking cover adapted to block the suction holes within a desired region.

9. The personal air cleaning apparatus according to claim 1, wherein the conduit comprises:
an inner conduit connected at one end thereof to the suction guide while being connected at the other end thereof to a sucking section included in the filter; and
an outer conduit arranged around the inner conduit while defining a passage for clean air in cooperation with the inner conduit, the outer conduit being connected at one end thereof to the discharge guide, and at the other end thereof to a discharge section included in the filter.

10. The personal air cleaning apparatus according to claim 1, wherein the conduit unit has a detachable end structure so as to adjust its length, while having no portion thereof sharply bent through an angle of more than 90°, so as not to interfere with the flow of air.

11. The personal air cleaning apparatus according to claim 1, wherein the position determining member comprises:
a base fixed to the floor;
a plurality of hinge members arranged between the base and the neck of the sucking/discharging unit while being uniformly spaced apart from one another, and adapted to protect the conduit; and
link members adapted to connect the hinge members.

12. The personal air cleaning apparatus according to claim 11, wherein each of the hinge members comprises:
a pair of inner plates spaced apart from each other by a desired gap to receive the conduit therebetween;
connecting rods adapted to connect the inner plates while maintaining the gap between the inner plates; and
a pair of outer plates rotatably mounted to the inner plates outside the inner plates, respectively, each of the outer plates being coupled with an associated one of the link members.

13. The personal air cleaning apparatus according to claim 1, wherein the conduit unit comprises a flexible hose, and the position determining member comprises locking means mounted to a desired portion of the sucking/discharging unit, and adapted to lock the sucking/discharging unit in a position adjusted state in vertical and horizontal directions.

14. The personal air cleaning apparatus according to claim 1, wherein the conduit unit is provided with an attenuation member for attenuating vibrations or noise caused by air flowing through the conduit.

15. The personal air cleaning apparatus according to claim 1, wherein the sucking/discharging unit has a humidification or illumination function.

16. A personal air cleaning apparatus comprising:
a sucking/discharging unit having a suction port for drawing in contaminated air, a discharge port for discharging filtered air, and a filter for filtering contaminants contained in air;
a filter for outwardly discharging contaminated air received from the sucking/discharging unit;
a conduit unit for connecting the sucking/discharging unit to the filter; and
a position determining member arranged around the conduit unit and adapted to allow the conduit unit to be bent without being folded, while fixing the position of the sucking/discharging unit, wherein said sucking/discharging unit comprises:
a suction guide provided with a suction port at one end thereof while being connected to the conduit at the other end thereof;
a suction port cap mounted to the suction port of the suction guide while having a plurality of suction holes to guide the flow of air introduced therein;
a discharge guide formed with a discharge port at one end thereof, connected to the conduit unit at the other end thereof, and arranged around the suction guide while being spaced apart from the suction guide by a desired gap to guide the flow of discharged air while having a shape similar to that of the suction guide;
a U-turn guide mounted to the other end of the discharge guide and adapted to partially return, to the discharge port, contaminated air introduced by the suction guide; and
a filter arranged between the suction guide and the discharge guide and adapted to filter the contaminated air returned by the U-turn guide.

17. The personal air cleaning apparatus according to claim 16, wherein the sucking/discharging unit further comprises flow rate control means installed between the discharge guide and the suction guide and adapted to control the amount of air supplied to the filter.

18. The personal air cleaning apparatus according to claim 16, wherein the U-turn guide is adjustable in installation angle to adjust the amount of air returned to the discharge port.

19. The personal air cleaning apparatus according to claim 16, wherein guide vanes are mounted to a downstream end of the discharge guide to change the flow direction of discharged air.

20. A personal air cleaning apparatus comprising:
a sucking/discharging unit having a suction port for drawing in contaminated air, and a discharge port for discharging filtered air;
a filter for outwardly discharging air received from the sucking/discharging unit while supplying clean air via the sucking/discharging unit;
a conduit unit for connecting the sucking/discharging unit to the filter; and a position determining member arranged around the conduit unit and adapted to allow the conduit unit to be bent without interrupting air flow therethrough, while fixing the position of the sucking/discharging unit, an inner conduit connected at one end thereof to the suction guide while being connected at the other end thereof to a sucking section included in the filter; and an outer conduit arranged around the inner conduit while defining a passage for clean air in cooperation with the inner conduit, the outer conduit being connected at one end thereof to the discharge guide, and at the other end thereof to a discharge section included in the filter, and wherein the conduit has a detachable end structure so as to adjust its length, while having no portion thereof sharply bent through an angle of more than 90°, so as no to interfere with the flow of air.

21. The personal air cleaning apparatus according to claim 20, wherein the filter comprises:

a suction section connected to the suction guide of the sucking/discharging unit, and adapted to generate a sucking force;

a blower connected to the discharge guide of the sucking/discharging unit, and adapted to feed clean air under pressure;

a motor for simultaneously driving the suction section and the blower;

a suction section for connecting the suction section to the inner conduit of the conduit; and a discharge section for connecting the blower to the outer conduit.

22. The personal air cleaning apparatus according to claim 21, wherein the suction section and the blower communicate with the atmosphere and serve to outwardly discharge contaminated air into the atmosphere while sucking fresh air and feeding the sucked air under pressure.

23. The personal air cleaning apparatus according to claim 21, wherein the suction section communicates with the blower, and an air filtering chamber is arranged between the suction section and the blower, so that contaminated air introduced into the filter through the suction section is filtered in the air filtering chamber and then feed under pressure by the blower.

24. The personal air cleaning apparatus according to claim 21, wherein each of the suction and discharge sections has a branched tube structure so that it allows a plurality of sucking/discharging units to be simultaneously connected thereto.

* * * * *